3,786,131
COMBATTING ARTHROPODS WITH PHENYLHY-DRAZONES OF 1,2-DICARBONYL COMPOUNDS

Karl-Heinz Büchel and Wilfried Draber, Leverkusen, Ingeborg Hammann, Cologne, and Günter Unterstenhöfer, Opladen, Germany, assignors to Bayer Aktiengesellschaft, Leverkusen, Germany
No Drawing. Original application Sept. 24, 1968, Ser. No. 762,155, now Patent No. 3,641,098. Divided and this application Apr. 8, 1971, Ser. No. 132,542
Claims priority, application Germany, Sept. 26, 1967, P 16 68 025.4
Int. Cl. A01n 9/12, 9/20
U.S. Cl. 424—304        10 Claims

ABSTRACT OF THE DISCLOSURE

α-(Halo, cyano, nitro and azido)-α-(alkanoyl, carboalkoxy [i.e. alkoxy carbonyl], amino and mono- and dialkyl amino)-carbonyl-(unsubstituted and mono to penta alkyl and/or electronegative substituent [e.g. halo, nitro, cyano, trifluoromethyl, trifluoromethyl-mercapto, -sulfonyl, and -sulfoxyl, alkoxy, alkyl sulfonyl and/or dimethylamino sulfonyl]-substituted) phenyl hydrazones and their corresponding alkali metal, alkaline earth metal and amine salts, which possess pesticidal, especially acaricidal and insecticidal, properties and which may be produced by conventional methods.

---

This application is a division of U.S. patent application Ser. No. 762,155, filed Sept. 24, 1968, now U.S. Pat. No. 3,641,098.

The present invention relates to and has for its objects the provision for new phenylhydrazones of 1,2-dicarbonyl compounds, i.e. α,α-substituted carbonyl-phenylhydrazones or N-(carbonyl-methyleneimino)-anilines, which possess pesticidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropids, with other and further objects becoming apparent from a study of the within specification and accompanying examples.

It is already known that certain phenylhydrazones of dicyanoketone, for example α,α-dicyano-carbonyl-2,5-dichlorophenylhydrazone (A) can be used for the control of insects and mites (see U.S. Pat. 3,157,569).

It has been found in accordance with the present invention that the new phenylhydrazones of the formula

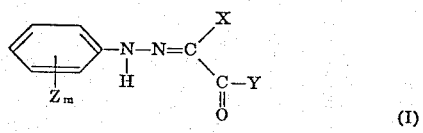

(I)

in which
X is halogen, cyano, nitro or azido,
Y is $C_{1-4}$ alkyl, $C_{1-4}$ alkoxy or —NRR',
R and R' are hydrogen of $C_{1-3}$ alkyl,
Z is $C_{1-4}$ alkyl, alkoxy, or an electronegative substituent,
m is a whole number from 1 to 5, and their alkali metal salts, alkaline earth metal salts and amine salts, exhibit strong pesticidal, especially insecticidal and acaricidal, properties.

The present invention further provides a process for the production of the new compounds of Formula I above in which

[a] A diazotized amine of the formula

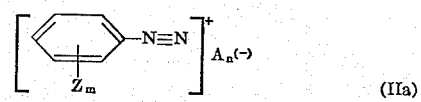

(IIa)

in which
Z and m are the same as defined above, and
$A_n$ stands for an anion introduced by the diazotization, is reacted, optionally in the presence of a solvent, with an active methylene compound of the formula

(IIb)

in which
X and Y are the same as defined above, or

[b] A diazotization product of an amine according to Formula IIa above is reacted with a 2-halogen-1,3-dicarbonyl compound of the formula

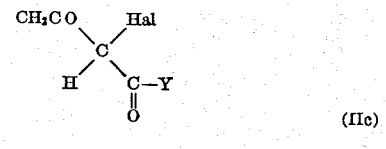

(IIc)

in which
Y is the same as defined above, and
Hal is halogen such as chloro, bromo, iodo or fluoro, optionally in the presence of a solvent, or

[c] A phenylhydrazone compound of the formula

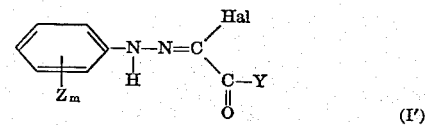

(I')

in which
Y, Z and m are the same as defined above, and
Hal is halogen such as chloro, bromo, iodo or fluoro, is reacted, optionally in the presence of a solvent, with an alkali metal salt of the formula

MeX'        (IId)

in which
Me is an alkali metal such as sodium, potassium or lithium, and
X' is cyano, azido or nitro.

It is to be noted that the starting materials (I') of the process [c] can be prepared according to the processes [a] and [b], all of which are new compounds according to the present invention.

The term solvent as used herein includes mere diluents, as the artisan will appreciate.

It is surprising that the new phenylhydrazones according to the present invention exhibit a stronger insecticidal and acaricidal effectiveness than the chemically very similar previously know phenylhydazones.

If 3,5-bis(trifluoromethyl)aniline, which was diazotized in phosphoric acid with nitrosyl-sulfuric acid at 0–10° C., and cyano-acetic acid methyl ester are used as starting materials, the reaction course of the process variant [a] can be represented by the following equation:

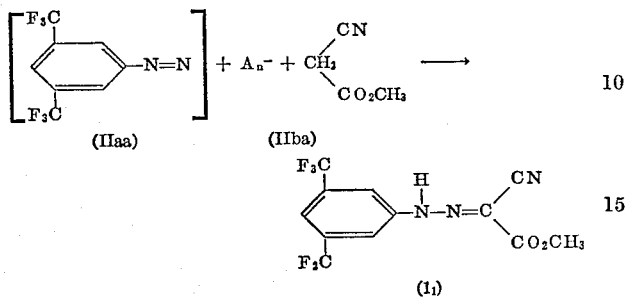

If 2-chloro-5-trifluoromethyl-aniline, which was diazotized in concentrated hydrochloric acid with NaNO₂, and α-chloro-acetyl-acetone are used as starting materials, a phenylhydrazone according to the present invention is obtained which can be reacted for example with KCN, to give a further phenylhydrazone according to the present invention.

The reaction course according to process variants [b] and [c] is represented by the following overall equation:

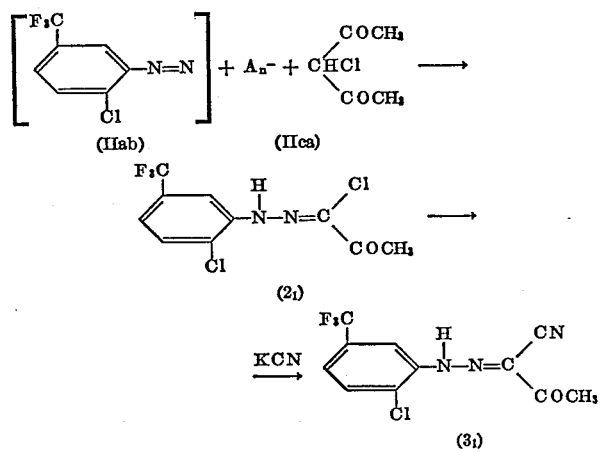

The starting materials (IIa), (IIb) and (IIc) used for process variants [a] and [b], as well as the starting materials (IId) used for process variant [c] are already known and can be prepared in simple manner according to known processes. The starting materials (I') used for process variant [c] are new compounds of the present invention and, of course, are obtained according to the process variants [a] and [b].

Advantageously, in accordance with the present invention, in the various formulae herein:

X represents
  halo such as chloro, bromo, iodo and fluoro, especially chloro and bromo, and particularly chloro;
  cyano;
  nitro; or
  azido, i.e. —N₃;
Y represents
  straight and branched chain alkyl having 1–4 carbon atoms such as methyl to tert.-butyl inclusive, especially methyl, ethyl, n- and iso-propyl, n-, iso- and s-butyl, and the like, more particularly alkyl having 1–3 carbon atoms, and preferably methyl;
  straight and branched chain alkoxy having 1–4 carbon atoms such as methoxy to tert.-butoxy inclusive, especially methoxy, ethoxy, n- and iso- and s-butoxy, and the like, more particularly alkoxy having 1–3 carbon atoms, and preferably methoxy and ethoxy; or
  —NRR' in which R and R' each individually represents hydrogen or alkyl having 1–3 carbon atoms such as methyl to isopropyl inclusive as defined above; especially amino (—NH₂) and mono- and di-methyl amino;
Z represents
  straight and branched chain alkyl or alkoxy having 1–4 carbon atoms such as methyl to tert.-butyl inclusive as defined above for Y, more particularly alkyl having 1–3 carbon atoms, and preferably methyl and ethyl, and mixtures thereof; and/or
  electronegative substituents such as
    halo, such as chloro, bromo, iodo and/or fluoro, especially chloro, fluoro and/or bromo, and more particularly chloro and/or fluoro;
    nitro;
    cyano;
    difluoromethyl;
    trifluoromethyl;
    trifluoromethylmercapto, i.e. CF₃—S—;
    difluorochloromethylmercapto, i.e. CF₂Cl—S—;
    trifluoromethyl sulfonyl, i.e. CF₃—SO₂—;
    trifluoromethyl sulfoxyl, i.e. CF₃—SO—;
    alkyl sulfonyl having 1–4 carbon atoms such as methyl to tert.-butyl inclusive, as defined above, -sulfonyl, especially C₁₋₃ alkyl sulfonyl, and more especially methyl- and ethyl-sulfonyl, i.e. C₁₋₄ alkyl-SO₂—;
    dimethylamino sulfonyl, i.e. (CH₃)₂N—SO₂—; and
  $m$ is a whole number from 1 to 5, especially 1 to 4 or 1 to 3.

The corresponding salts of the instant compounds include the alkali metal salts such as the Na, K, Li, etc. salts, the alkaline earth metal salts such as the Ca, Mg, Ba, Sr, etc. salts, and the amine salts such as secondary and tertiary amine salts such as tri C₁₋₄ alkyl and C₁₋₄ alkyl-phenyl amines, e.g. tri, same and mixed methyl to butyl-amine, methyl to butyl-phenylamine, etc., especially triethyl and ethyl-phenyl amines.

Preferably, X is chloro, bromo, cyano, nitro or azido, Y is C₁₋₄ alkyl, C₁₋₂ alkoxy, amino or monomethylamino, Z is C₁₋₂ alkyl, chloro, fluoro, nitro, cyano, difluoromethyl, difluorochloromethylmercapto, trifluoromethylmercapto, trifluoromethylsulfonyl, C₁₋₂ alkylsulfonyl, dimethylaminosulfonyl, and/or methoxy, with $m$ being 1–5.

In particular, X is chloro or cyano; Y is C₁₋₄ alkyl or C₁₋₂ alkoxy, Z is methyl, chloro, nitro, trifluoromethyl, trifluoromethylmercapto and/or trifluoromethylsulfonyl, with $m$ being 1–5, preferably 1–4 or 1–3.

It will be realized that the process variants [a] and [b] are carried out under practically the same reaction conditions.

As solvents, water and water-miscible organic solvents are suitable. These include alcohols such as methanol and ethanol, as well as acetic acid, and the like. The organic solvents serve as solubilizer for the methylene component. The reaction is preferably carried out in a pH range of about 4–8. For the buffering of the mineral acids present in the reaction mixture, bases such as sodium acetate, sodium carbonate, sodium hydroxide, and the like, are added.

The reaction temperatures used are, in general, substantially between about —20 to +30° C., preferably from about —10 to +20° C.

When carrying out the reaction, the starting materials are preferably used in equimolar proportions, the methylene or dicarbonyl component optionally in a small excess. The reaction is, in general, complete after 2–6 hours, it being preferable in many cases to continue stirring for several hours at room temperature. The phenylhydrazones of the present invention are, in general, obtained in crystalline form and can be isolated by filtration from the reaction mixture.

When carrying out process variant [c], the work is accomplished in similar manner. The same solvents and solvent mixtures are used. In this case, however, the pH value is not important. The temperatures used are, in general, substantially between about 0 to 80° C., preferably from about 20 to 70° C.

The phenylhydrazones of the present invention obtained according to the three variants of the process can be converted in the usual manner into their alkali metal salts, alkaline earth metal salts and amine salts. Particularly useful are the sodium, potassium, calcium, magnesium, triethylamine and ethyleniline salts.

The preparation of these solutions is carried out in the usual manner, for example by dissolving the instant phenylhydrazones in organic solvents such as alcohols and adding the appropriate bases. The salts are in most cases sparingly soluble and precipitate, but can also be precipitated with ether. It is also possible to evaporate the solvent.

Advantageously, the active compounds according to the present invention exhibit strong insecticidal and acaricidal activities, with low phytotoxicity and relatively low mammalian toxicity. The active compounds can, therefore, be used with good results for the control of noxious sucking and biting insects, Diptera as well as mites (Acarina). The effects set in rapidly and are long-lasting.

To the sucking insects contemplated herein, there belong aphids, such as the green peach aphid (*Myzus persicae*), the bean aphid (*Doralis fabae*); scales, such as *Aspidiotus hederae*, *Lecanium hesperidum*, *Pseudococcus maritimus*; Thysanoptera, such as *Hercinothrips femoralis*; and bugs, such as the beet bug (*Piesma quadrata*) and the bed bug (*Cimex lectularius*), and the like.

With the biting insects contemplated herein, there are classed butterfly caterpillars, such as *Plutella maculipennis*, *Lymantria dispar*; beetles, such as granary weevils (*Sitophilus granarius*), the Colorado beetle (*Leptinotarsa decemlineata*), but also species living in the soil, such as the wireworms (*Agriotes* sp.) and larvae of the cockchafer (*Melolontha melolontha*); cockroaches, such as the German cockroach (*Blattella germanica*); Orthoptera, such as the house cricket (*Gryllus domesticus*); termites, such as Reticulitermes; Hymenoptera, such as ants, and the like.

The Diptera contemplated herein comprise in particular the flies, such as the vinegar fly (*Drosophila melanogaster*), the Mediterranean fruit fly (*Ceratitis capitata*), the house fly (*Musca domestica*) and mosquitoes, such as the yellow fever mosquito (*Aedes aegypti*), and the like.

In the case of the mites contemplated herein, particularly important are the spider mites (Tetranychidae) such as the two-spotted spider mite (*Tetranychus telarius* or *urticae*), the European red mite (*Paratetranychus pilosus*); blister mites, such as the currant blister mite (*Eriophyes ribis*) and tarsonemids, such as *Tarsonemus pallidus*, and ticks, and the like.

If the instant phenylhydrazones are used in the form of their corresponding salts, their effectiveness changes, in general, only extremely slightly.

The active compounds according to the instant invention can be utilized, if desired, in the form of the usual formulations or compositions with conventional pesticidal diluents or extenders, i.e. conventional dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby for example in the case where water is used as diluent, organic solvents may be added as auxiliary solvents. The following may be chiefly considered for use as conventional carrier vehicles for this purpose: dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–80% or even 20–80%, but preferably 0.001–5%, by weight of the mixture. Thus, the present invention contemplates over-all compositions which comprise mixtures of a conventional pesticidal dispersible carrier vehicle such as (1) a dispersible carrier solid, and/or (2) a dispersible carrier liquid such as an inert organic solvent and/or water, preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.001–80%, by weight of the mixture.

The active compounds can also be used in accordance with the well-known ultra-low-volume process with good success, i.e. by applying such compound if normally a liquid, or by applying a liquid composition containing the same, via very effective atomizing equipment in extremely finely divided form, i.e. mist form, for example by airplane crop spraying techniques. Only a few liters/hectare are needed, and often amounts up to about 1 quart/acre, preferably 2–16 fluid ounces/acre, are sufficient. In this process it is possible to use highly concentrated liquid compositions with said liquid carrier vehicles containing from about 40 to about 95% by weight of active compound or even the 100% active substance alone, e.g. about 40–100% by weight of the active compound.

Furthermore, the present invention contemplates methods of selectively controlling or combating pests, e.g. arthropods, i.e. insects and acarids, and more particularly, methods of combating at least one of insects and acarids which comprises applying to at least one of correspondingly (a) such insects, (b) such acarids, and (c) the corresponding habitat, i.e. the locus to be protected, a correspondingly combative amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The outstanding activity of the new compounds of the present invention is illustrated without limitation by the following examples.

EXAMPLE 1

Plutella test

Solvent: 3 parts by weight dimethyl formamide.
Emulsifier: 1 part by weight alkylaryl polyglycol ether.

To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the preparation of the given active compound until dew moist and are then infested with caterpillars of the diamond back moth (*Plutella maculipennis*).

After the specified period of time, the degree of destruction is determined as a percentage: 100% means that all the caterpillars are killed whereas 0% means that none of the caterpillars are killed.

The particular active compounds tested, their concentrations, the evaluation time and the results obtained can be seen from the following Table 1:

TABLE 1
[Plant-damaging insects]

| Active compound | Concentration of active compound in percent | Degree of destruction in percent after 3 days |
|---|---|---|
| (A) [2,4-dichlorophenyl hydrazone of dicyanide, known] | 0.2<br>0.02 | 100<br>0 |
| (4₁) [2,4,5-trichlorophenyl hydrazone, CN, C-OC₂H₅, O] | 0.2<br>0.02 | 100<br>100 |
| (5₁) [2-chloro-4-nitro-6-chloro phenyl hydrazone, CN, C-OC₂H₅, O] | 0.2<br>0.02 | 100<br>100 |
| (6₁) [4-CF₃-2-Cl phenyl hydrazone, CN, C-OCH₃, O] | 0.2<br>0.02 | 100<br>100 |
| (7₁) [4-CF₃-2-Cl phenyl hydrazone, CN, C-OC₂H₅, O] | 0.2<br>0.02 | 100<br>100 |
| (1₂) [3,5-bis(CF₃) phenyl hydrazone, CN, C-OCH₃, O] | 0.2<br>0.02<br>0.002 | 100<br>100<br>100 |
| (8₀) [2,4-bis(CF₃) phenyl hydrazone, CN, C-OC₂H₅, O] | 0.2<br>0.02<br>0.002 | 100<br>100<br>80 |

TABLE 1—Continued

| Active compound | | Concentration of active compound in percent | Degree of destruction in percent after 3 days |
|---|---|---|---|
| (9₁) | 2-Cl-C₆H₄-NH-N=C(Cl)-C(=O)-CH₃ (2,6-diCl-phenyl) | 0.2<br>0.02<br>0.002 | 100<br>100<br>50 |
| (10₁) | 4-Cl-C₆H₄-NH-N=C(Cl)-C(=O)-CH₃ | 0.2<br>0.02 | 100<br>100 |
| (11₁) | 3,4-diCl-C₆H₃-NH-N=C(Cl)-C(=O)-OC₂H₅ | 0.2<br>0.02 | 100<br>100 |

EXAMPLE 2

A further test was carried out in the same manner as Example 1 and the results are set out below in Table 2.

TABLE 2
[Plant-damaging insects]

| Active compound | | Concentration of active compound in percent | Degree of destruction in percent after 3 days |
|---|---|---|---|
| (12₁) | 3,5-diCl-C₆H₃-NH-N=C(CN)-C(=O)-CH₃ | 0.2<br>0.02<br>0.002 | 100<br>100<br>60 |
| (13₁) | 3,5-diCl-C₆H₃-NH-N=C(CN)-C(=O)-C(CH₃)₃ | 0.2<br>0.02 | 100<br>100 |
| (14₁) | 3,4-diCl-C₆H₃-NH-N=C(CN)-C(=O)-CH₃ | 0.2<br>0.02 | 100<br>100 |
| (15₁) | 2,4,5-triCl-C₆H₂-NH-N=C(CN)-C(=O)-C(CH₃)₃ | 0.2<br>0.02 | 100<br>100 |
| (16₁) | 4-Cl-2-CF₃-C₆H₃-NH-N=C(CN)-C(=O)-C(CH₃)₃ | 0.2<br>0.02 | 100<br>100 |
| (17₁) | 3-CF₃-2-CF₃-C₆H₃-NH-N=C(CN)-C(=O)-C(CH₃)₃ | 0.2<br>0.02 | 100<br>100 |
| (18₁) | 4-(F₃C-S)-C₆H₄-NH-N=C(CN)-C(=O)-CH₃ | 0.2<br>0.02<br>0.002 | 100<br>100<br>90 |

EXAMPLE 3

Phaedon larvae test

Solvent: 3 parts by weight dimethyl formamide.
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with this preparation of the given active compound until dripping wet and then infested with mustard beetle larvae (*Phaedon cochleariae*).

After the period of time stated in the following table, the degree of destruction of the pests is determined and expressed as a percentage: 100% means that all and 0% means that none of the beetle larvae are killed.

The particular active compounds tested, their concentrations, the evaluation time and the experimental results obtained can be seen from the following Table 3:

TABLE 3
[Plant-damaging insects]

| Active compound | Concentration of active compound in percent | Degree of destruction in percent after 3 days |
|---|---|---|
| (A) 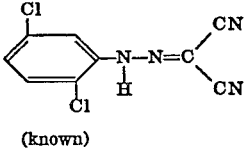 (known) | 0.2<br>0.02 | 100 |
| ($19_1$) 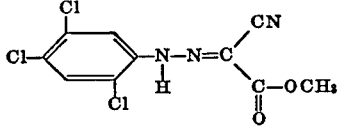 | 0.2<br>0.02 | 100<br>100 |
| ($4_1$) 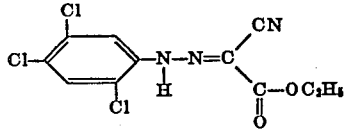 | 0.2<br>0.02 | 100<br>100 |
| ($20_1$) 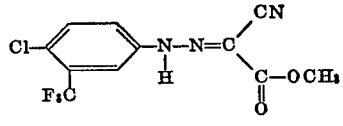 | 0.2<br>0.02<br>0.002 | 100<br>100<br>50 |
| ($21_1$) 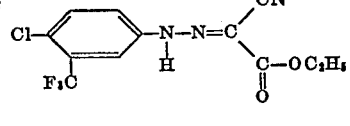 | 0.2<br>0.02 | 100<br>100 |
| ($22_1$) 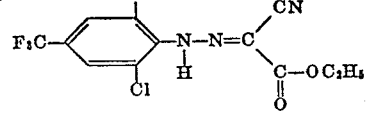 | 0.2<br>0.02 | 100<br>100 |
| ($23_1$) 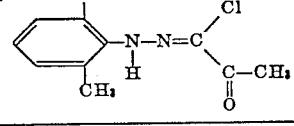 | 0.2<br>0.02 | 100<br>100 |

EXAMPLE 4

A further test was carried out in the same manner as Example 3 and the results are set out below in Table 4:

TABLE 4
[Plant-damaging insects]

| Active compound | Concentration of active compound in percent | Degree of destruction in percent after 8 days |
|---|---|---|
| ($24_1$) 2,4-Cl$_2$-C$_6$H$_3$-NH-N=C(CN)(CO$_2$-CH$_3$) | 0.2 / 0.02 | 100 / 100 |
| ($25_1$) 2,4-Cl$_2$-C$_6$H$_3$-NH-N=C(CN)(CO$_2$-C$_2$H$_5$) | 0.2 / 0.02 | 100 / 100 |
| ($26_1$) 4-(F$_3$C-SO$_2$)-C$_6$H$_4$-NH-N=C(CN)(CO$_2$-CH$_3$) | 0.2 / 0.02 | 100 / 100 |

EXAMPLE 5

Tetranychus test

Solvent: 3 parts by weight dimethyl formamide.
Emulsifier: 1 part by weight alkylaryl polyglycol ether.

To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet.

These bean plants are then heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100% means that all the spider mites are killed whereas 0% means that none of the spider mites are killed.

The particular active compounds tested, their concentrations, the evaluation time and the results obtained can be seen from the following Table 5:

TABLE 5
[Plant-damaging mites]

| Active compound | Concentration of active compound in percent | Degree of destruction in percent after 8 days |
|---|---|---|
| (A) 2,4-Cl$_2$-C$_6$H$_3$-NH-N=C(CN)(CN) (known) | 0.2 / 0.02 | 70 / 0 |
| ($27_1$) 3-F$_3$C-C$_6$H$_4$-NH-N=C(CN)(C(O)-OCH$_3$) | 0.2 / 0.02 | 90 / 60 |
| ($28_1$) 4-F$_3$C-C$_6$H$_4$-NH-N=C(CN)(C(O)-OCH$_3$) | 0.2 / 0.02 | 98 / 80 |
| ($1_3$) 3,5-(F$_3$C)$_2$-C$_6$H$_3$-NH-N=C(CN)(C(O)-OCH$_3$) | 0.2 / 0.02 / 0.002 | 100 / 100 / 50 |

TABLE 5—Continued

| Active compound | Concentration of active compound in percent | Degree of destruction in percent after 8 days |
|---|---|---|
| (20₂) 4-Cl, 3-CF₃-C₆H₃-NH-N=C(CN)-C(O)-OCH₃ | 0.2<br>0.02 | 98<br>90 |
| (22₂) 2,6-Cl₂, 4-CF₃-C₆H₂-NH-N=C(CN)-C(O)-OC₂H₅ | 0.2<br>0.02 | 100<br>100 |
| (29₁) 2,6-(CH₃)₂-C₆H₃-NH-N=C(CN)-C(O)-OC₂H₅ | 0.2<br>0.02 | 100<br>60 |
| (9₂) 2-Cl-C₆H₄-NH-N=C(Cl)-C(O)-CH₃ | 0.2<br>0.02 | 100<br>60 |
| (30₁) 2-Cl-C₆H₄-NH-N=C(Cl)-C(O)-OC₂H₅ | 0.2<br>0.02 | 100<br>98 |
| (10₂) 4-Cl-C₆H₄-NH-N=C(Cl)-C(O)-CH₃ | 0.2<br>0.02 | 100<br>98 |
| (31₁) 3,4-Cl₂-C₆H₃-NH-N=C(Cl)-C(O)-CH₃ | 0.2<br>0.02 | 98<br>70 |
| (32₁) 2,4,5-Cl₃-C₆H₂-NH-N=C(Cl)-C(O)-CH₃ | 0.2<br>0.02<br>0.002 | 100<br>100<br>50 |
| (2₂) 2-Cl, 5-CF₃-C₆H₃-NH-N=C(Cl)-C(O)-CH₃ | 0.2<br>0.02 | 100<br>60 |
| (33₁) 3,5-(CF₃)₂-C₆H₃-NH-N=C(Cl)-C(O)-CH₃ | 0.2<br>0.02 | 100<br>60 |
| (34₁) 3,5-(CF₃)₂-C₆H₃-NH-N=C(Cl)-C(O)-OC₂H₅ | 0.2<br>0.02 | 100<br>70 |

EXAMPLE 6

A further test was carried out in the same manner as Example 5 and the results are set out below in Table 6:

TABLE 6
[Plant-damaging mites]

| Active compound | Concentration of active compound in percent | Degree of destruction in percent after 8 days |
| --- | --- | --- |
| (35₁) 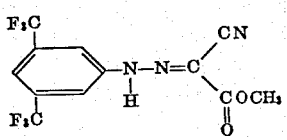 | 0.2<br>0.02 | 100<br>98 |
| (36₁) | 0.2<br>0.02 | 100<br>80 |
| (37₁) | 0.2<br>0.02 | 100<br>90 |

EXAMPLE 7

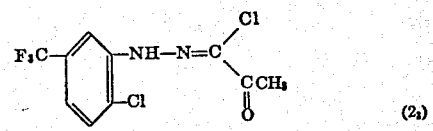

(1₂)

115 g. 3,5-di-(trifluoromethyl)-aniline are diazotized in 400 ml. of 85% H₃PO₄ with 157.5 g. of 41% nitrosyl-sulfuric acid at 5–10° C. After diazotization, the mixture is diluted with 1000 ml. of water and filtered. This diazonium salt solution is added dropwise at 0–10° C., with stirring, to a mixture of 49.5 g. cyanoacetic acid methyl ester in 1000 ml. of 50% acetic acid and 1.1 kg. sodium acetate. In the mixture a pH value of 5 is maintained by further addition of aqueous sodium acetate solution. After completion of the addition of the diazonium salt solution, stirring is continued for 1 hour, and the precipitated product is filtered off with suction and washed with several liters of water. The residue is taken up in methylene chloride, dried over sodium sulfate, and the residue obtained after the methylene chloride has been distilled off is recrystallized from white spirit. 136 g. (80% of the theory) of α-cyano-α-carbomethoxy-carbonyl-,35-bis(trifluoromethyl)-phenylhydrazone are obtained as pale-yellow needles of M.P. 155° C.

EXAMPLE 8

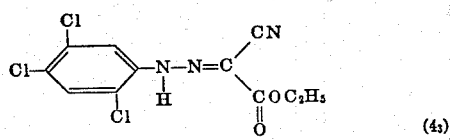

(4₂)

98.5 g. 2,4,5-trichloroaniline are diazotized in 400 ml. of concentrated H₂SO₄ (d.=1.84) with 157.5 parts of 41% nitrosyl-sulfuric acid at 5–10° C. After diazotization, the mixture is diluted with 1000 ml. of chopped ice and filtered. This diazonium salt solution is then added dropwise at 0–15° C., with stirring, to a mixture of 57 g. cyanoacetic acid ethyl ester, 250 ml. acetic acid, 1500 ml. of ice water and 2 kg. sodium acetate. A pH value of 4–5 in the mixture is maintained by further addition of sodium acetate. Dilution with 1000 ml. of water is then effected and stirring is continued for 1 hour. The precipitated product is filtered off with suction and the reaction product is separated from inorganic salts by taking up with methylene chloride. After drying and distilling off of the methylene chloride, 122 g. (76% of the theory) of α-cyano-α-carboethoxy - carbonyl-2,4,5-trichloro-phenylhydrazone are obtained. Recrystallization from ethanol gives yellow needles of M.P. 133–134° C.

EXAMPLE 9

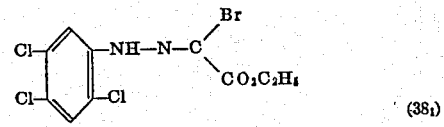

(2₂)

195.5 g. (1 mol) 2-chloro-5-(trifluoromethyl)-aniline are dissolved in 560 g. of concentrated hydrochloric acid. Part of the hydrochloride precipitates. The suspension is added to 1.8 kg. of ice and 1200 ml. of water and diazotization is effected rapidly at 0° C. with 72 g. (1.05 mols) sodium nitrite in 160 ml. of water. The solution of the diazonium salt is filtered and added dropwise at 0–5° C. to a mixture of 134.5 g. (1 mol) of α-chloro-acetylacetone in 600 ml. ethanol and 500 g. potassium acetate in 800 ml. of water. During coupling, the pH value was kept to about 6 by the addition of further potassium acetate. The ice cooling is removed and stirring is continued for 4 hours; suction filtration is effected followed by washing thoroughly with water and recrystallization from ethanol. 183 g. (61%) α - chloro-α-acetyl-carbonyl-2-chloro-5-(trifluoromethyl)-phenylhydrazone are obtained as pale yellow crystals of M.P. 151–153° C.

EXAMPLE 10

(38₁)

To 400 ml. of 85% phosphoric acid there are added slowly, at −10° C., 157.5 g. nitrosyl-sulfuric acid (42%, d.=1.905). 98.2 g. (0.5 mol) 2,4,5-trichloro-aniline are introduced into the mixture at 5–10° C. Stirring is effected for 3 hours at 10° C., followed by filtration. The diazonium salt solution is then added dropwise to a mixture of 104.5 g. α-bromo-acetoacetic acid ethyl ester, 900 ml. ethanol, 2 kg. ice and 1.1 kg. sodium acetate. The pH value is kept to 5–6 by possible further addition of sodium acetate. After completion of the diazonium salt solution, stirring is continued at 10–20° C. for 4 hours, followed by dilution with 4000 ml. of water and suction filtration. The residue on the filter is washed well with water and recrystallized from ethanol. 23.5 g. (45%) α-bromo-α- carboethoxy-carbonyl - 2,4,5 - trichloro-phenylhydrozone are obtained in the form of a yellowish-grey crystal powder. M.P. 106–110° C.

EXAMPLE 11

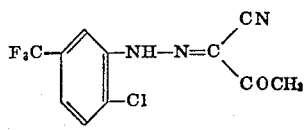

(3₂)

29.9 g. (0.1 mol) α-acetyl-α-chloro-carbonyl-2-chloro-5-(trifluoromethyl) - phenylhydrazone (prepared as described in Example 9) are dissolved in 300 ml. dimethyl formamide and added dropwise at room temperature, with vigorous stirring, to a solution of 7.1 g. (0.11 mol) KCN and 5.6 g. (0.1 mol) KOH in 750 ml. of water. After completion of the dropwise addition, stirring is continued for 15 minutes, and activated charcoal is added; filtration is effected and the filtrate is acidified with glacial acetic acid. The precipitate is filtered off with suction, washed with water and dried. 41.0 g. (85%) α-cyano-α-acetyl-carbonyl-2-chloro - 5 - (trifluoromethyl)-phenylhydrazone are obtained in the form of a pale yellow powder which, for purification, can be recrystallized from ethanol. M.P. 114–118° C.

EXAMPLE 12

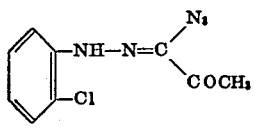

(39₁)

34.5 g. (0.15 mol) α-acetyl-α-chloro-carbonyl-2-chloro-phenylhydrazone, prepared in a manner analogous to Example 9, are dissolved in 500 ml. methanol, and 13.0 g. sodium azide (0.2 mol) are added. The mixture is boiled under reflux for 3 hours, with stirring; filtration from the precipitated sodium chloride is effected and the filtrate is concentrated to about one-fifth of the original volume. After cooling, the precipitated crystals are filtered off with suction and washing is effected with water, then with cold methanol. 23.5 g. (66%) α-azido-α-carbonyl-2-chloro-phenylhydrazone are obtained in the form of a pale brown crystalline substance which, for further purification, can be recrystallized from ethanol. M.P. 121–122° C., decomp.

In a manner analogous with that described in Examples 7–12, the following compounds according to Formula I above can be prepared:

TABLE 12

| | X | Y | Z | M.P., °C. |
|---|---|---|---|---|
| (7₁) | CN | —OC₂H₅ | 2-Cl, 5-CF₃ | 120–124 |
| (6₂) | CN | —OCH₃ | 2-Cl, 5-CF₃ | 143 |
| (19₁) | CN | —OCH₃ | 2,4,5-Cl₃ | 197 |
| (8₂) | CN | —OC₂H₅ | 3,5-(CF₃)₂ | 154 |
| (5₂) | CN | —OC₂H₅ | 2,6-Cl₂, 4-NO₂ | 146–147 |
| (40₁) | CN | —OCH₃ | 2,6-Cl₂, 4-NO₂ | 159–160 |
| (41₁) | CN | —OC₂H₅ | 2,5-Cl₂, 4-NO₂ | 157 |
| (42₁) | CN | —OCH₃ | 2,5-Cl₂, 4-NO₂ | 168 |
| (43₁) | CN | —OC₂H₅ | 2,4-NO₂ | 183–184 |
| (44₁) | CN | —OC₂H₅ | 4-SO₂CH₃ | 189 |
| (45₁) | CN | —OC₂H₅ | 2-CH₃, 6-NO₂ | 142–146 |
| (46₁) | CN | —OC₂H₅ | 2,5-Cl₂, 4-SO₂—N(CH₃)₂ | 160–163 |
| (47₁) | CN | —OC₂H₅ | 2-Cl, 4-CF₃ | 146 |
| (22₁) | CN | —OC₂H₅ | 2,6-Cl₂, 4-CF₃ | 116–117 |
| (48₁) | CN | —OCH₃ | 2,6-Cl₂, 4-CF₃ | 122 |
| (49₁) | CN | —OC₂H₅ | 2,3,4,5-Cl₄ | 139 |
| (50₁) | CN | —OC₂H₅ | 2-F, 5-CF₃ | 99–101 |
| (51₁) | CN | —OC₂H₅ | 2-CF₃ | 117–118 |
| (52₁) | CN | —OCH₃ | 2-CF₃ | 156–157 |
| (53₁) | CN | —OC₂H₅ | 3-CF₃ | 126 |
| (27₁) | CN | —OCH₃ | 3-CF₃ | 103 |
| (54₁) | CN | —OC₂H₅ | 4-CF₃ | 135–136 |
| (28₂) | CN | —OCH₃ | 4-CF₃ | 115 |
| (21₂) | CN | —OC₂H₅ | 3-CF₃, 4-Cl | 151 |
| (20₃) | CN | —OCH₃ | 3-CF₃, 4-Cl | 149 |
| (55₁) | CN | —OCH₃ | 2-CF₃, 4-Cl | 173–174 |
| (56₁) | CN | —OC₂H₅ | 2-NO₂, 4-CF₃ | 141 |
| (57₁) | CN | —OCH₃ | 2-NO₂, 4-CF₃ | 172 |
| (58₁) | CN | —OCH₃ | 2-CN, 5-Cl | 169 |
| (59₁) | CN | —OCH₃ | 2,4-(CN)₂ | 222 |
| (60₁) | CN | —OCH₃ | 3,4-(CN)₂ | 185 |
| (61₁) | CN | —OCH₃ | 2-CN, 4-NO₂ | 176–179 |
| (62₁) | CN | —NHCH₃ | 3,5-(CF₃)₂ | 248 |
| (63₁) | NO₂ | —OCH₃ | 3,5-(CF₃)₂ | 133–134 |

TABLE 12—Continued

| | X | Y | Z | M.P., °C. |
|---|---|---|---|---|
| (64₁) | NO₂ | —OC₂H₅ | 3,5-(CF₃)₂ | 107–109 |
| (65₁) | CN | —CH₃ | 3,5-(CF₃)₂ | 154–158 |
| (66₁) | CN | —CH₃ | 2,6-Cl₂, 4-NO₂ | 106–111 |
| (67₁) | N₃ | —CH₃ | 2-CF₃, 5-Cl | 138–139 |
| (68₁) | N₃ | —CH₃ | 3,5-(CF₃)₂ | 143.5 |
| (9₁) | Cl | —CH₃ | 2-Cl | 135–136 |
| (30₂) | Cl | —OC₂H₅ | 2-Cl | 92–94 |
| (10₂) | Cl | —CH₃ | 4-Cl | 160–172 |
| (31₂) | Cl | —CH₃ | 3,4-Cl₂ | 224–225 |
| (11₂) | Cl | —OC₂H₅ | 3,4-Cl₂ | 158–159 |
| (69₁) | Cl | —OC₂H₅ | 2-Cl, 5-CF₃ | 114–115 |
| (32₂) | Cl | —CH₃ | 2,4,5-Cl₃ | 145 |
| (33₂) | Cl | —CH₃ | 3,5-(CF₃)₂ | 184–187 |
| (34₂) | Cl | —OC₂H₅ | 3,5-(CF₃)₂ | 122–124 |
| (23₂) | Cl | —CH₃ | 2,6-(CH₃)₂ | 72–74 |
| (29₂) | Cl | —OC₂H₅ | 2,6-(CH₃)₂ | 42–43 |
| (70₁) | CN | —OCH₃ | 3,5-(CF₃)₂, K-salt | [1] 235 |
| (71₁) | NO₂ | CH₃ | 2-Cl | 118 |
| (72₁) | NO₂ | CH₃ | 4-Cl | 172–174 |
| (73₁) | NO₂ | CH₃ | 2-Cl, 5-CF₃ | 138–140 |
| (74₁) | NO₂ | CH₃ | 2,6-(CH₃)₂ | 107–110 |
| (75₁) | CN | NH₂ | 2,6-(CH₃)₂ | 199 |
| (76₁) | CN | —NHCH₃ | 2-Cl, 5-CF₃ | 214 |
| (77₁) | NO₂ | —OCH₃ | 2-Cl, 5-CF₃ | 149–151 |
| (78₁) | NO₂ | —OC₂H₅ | 2,4,5-Cl₃ | 117–119 |

[1] Decomposition.

EXAMPLE 13

In a manner analogous with that described in Examples 7–12, the following compounds according to Formula I above can be prepared:

TABLE 13

| | X | Y | Z | M.P., °C. |
|---|---|---|---|---|
| (3₁) | CN | CH₃ | 2-Cl, 5-CF₃ | 114–118 |
| (80₁) | CN | CH₃ | 4-Cl | 228–231 |
| (81₁) | CN | CH₃ | 2-Cl | 117–119 |
| (82₁) | CN | CH₃ | 3-Cl | 188–190 |
| (14₂) | CN | CH₃ | 3,4-Cl₂ | 202–203 |
| (12₂) | CN | CH₃ | 3,5-Cl₂ | 218–223 |
| (24₂) | CN | CH₃ | 2,4,5-Cl₃ | 138–140 |
| (83₁) | CN | CH₃ | 2-Cl, 6-CH₃ | 115–118 |
| (84₁) | CN | CH₃ | 2-CH₃, 4-Cl | 145–147 |
| (25₂) | CN | CH₃ | 2-CF₃, 4-Cl | 109–110 |
| (85₁) | CN | CH₃ | 2-NO₂ | 199–201 |
| (86₁) | CN | CH₃ | 4-NO₂ | 268–269 |
| (87₁) | CN | CH₃ | 3-Cl, 4-NO₂ | 222–223 |
| (88₁) | CN | CH₃ | 3-NO₂, 4-Cl | 247–248 |
| (89₁) | CN | CH₃ | 2-NO₂, 4,6-Cl₂ | 95–96 |
| (90₁) | CN | CH₃ | 2,5-Cl₂, 4-NO₂ | 176–178 |
| (91₁) | CN | CH₃ | 2,4-(NO₂)₂ | 150–151 |
| (92₁) | CN | CH₃ | 2-CH₃, 3-NO₂ | 149–150 |
| (93₁) | CN | CH₃ | 2,6-(CH₃)₂ | 125–129 |
| (94₁) | CN | CH₃ | 2,4,6-(CH₃)₃ | 86–88 |
| (95₁) | CN | CH₃ | 2,6-(C₂H₅)₂ | 72–73 |
| (96₁) | CN | CH₃ | 4-SO₂CH₃ | 245–247 |
| (97₁) | CN | CH₃ | 2-SO₂C₂H₅, 5-CF₃ | 189–190 |
| (98₁) | CN | C(CH₃)₃ | 3-Cl | 156–157 |
| (13₂) | CN | C(CH₃)₃ | 3,5-Cl₂ | 227–228.5 |
| (99₁) | CN | C(CH₃)₃ | 3,4-Cl₂ | 216–218 |
| (16₂) | CN | C(CH₃)₃ | 2-CF₃, 4-Cl | 145–147 |
| (17₂) | CN | C(CH₃)₃ | 2-Cl, 5-CF₃ | 163–164 |
| (100₁) | CN | C(CH₃)₃ | 2-CH₃, 4-Cl | 173–176 |
| (101₁) | CN | C(CH₃)₃ | 3,5-(CF₃)₂ | 124–128 |
| (15₂) | CN | C(CH₃)₃ | 2,4,5-Cl₃ | 158–161 |
| (18₂) | CN | CH₃ | 4-SCF₃ | 155–159 |
| (102₁) | CN | CH₃ | 2-SCF₃ | 78–83 |
| (103₁) | CN | CH₃ | 2-SO₂CF₃ | 174–175 |
| (104₁) | CN | C(CH₃)₃ | 4-SCF₃ | 88–99 |
| (105₁) | CN | OC₂H₅ | 2-SO₂C₂H₅, 5-CF₃ | 167–168 |
| (106₁) | CN | OC₂H₅ | 2-OCH₃, 4-NO₂, 5-CH₃ | 205 |
| (107₁) | CN | OC₂H₅ | 2-OCH₃, 4-Cl, 5-CH₃ | 149–152 |
| (108₁) | CN | OC₂H₅ | 2-CF₃, 4-Cl | 98–100 |
| (36₂) | CN | OC₂H₅ | 3,5-Cl₂ | 131–135 |
| (109₁) | CN | OCH₃ | 2,3,4,5,6-Cl₅ | 141 |
| (110₁) | CN | OCH₃ | 2-SO₂C₂H₅, 5-CF₃ | 187–189 |
| (111₁) | CN | OCH₃ | 2-OCH₃, 4-NO₂, 5-CH₃ | 190 |
| (112₁) | CN | OCH₃ | 2-OCH₃, 4-Cl, 5-CH₃ | 150–152 |
| (35₂) | CN | OCH₃ | 3,5-Cl₂ | 195–197 |
| (113₁) | CN | OCH₃ | 4-SCF₃ | 128 |
| (114₁) | CN | OCH₃ | 2-S—CF₃ | 99–100 |
| (37₂) | CN | OCH₃ | 4-SO₂CF₃ | 146–150 |
| (79₁) | CN | OCH₃ | 3-CHF₂, 4-Cl | 136 |
| (115₁) | CN | CH₃ | 4-S—CClF₂ | 96 |

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, i.e. both in the specification and claims, the terms "arthropod," "anthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed anthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A method of combating arthropods which comprises applying to such arthropods or their habitat an arthropedically effective amount of a compound of the formula

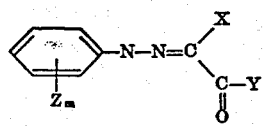

in which
  X is selected from the group consisting of halo, cyano and nitro,
  Y is selected from the group consisting of alkyl having 1–4 carbon atoms, alkoxy having 1–4 carbon atoms and —NRR' in which R and R' each individually is selected from the group consisting of hydrogen and alkyl having 1–3 carbon atoms,
  Z is selected from the group consisting of alkyl having 1–4 carbon atoms, halo, nitro, cyano, trifluoromethyl, trifluoromethylmercapto, trifluoromethylsulfonyl, trifluoromethylsulfoxyl, alkylsulfonyl having 1–4 carbon atoms, dimethylamino sulfonyl and alkoxy having 1–4 carbon atoms, and
  m is a whole number from 1–5, or the alkali metal, alkaline earth metal or the amine salt thereof,
alone or in admixture with a solid or liquid diluent or carrier.

2. The method of claim 1 in which
  Y is selected from the group consisting of alkyl and alkoxy having 1–4 carbon atoms,
  each individual Z is selected from the group consisting of methyl, trifluoromethyl, trifluoromethylmercapto, chloro, nitro and cyano, and
  m is a whole number from 1–3.

3. The method of claim 1 wherein such compound is α-cyano - α - carbomethoxy-carbonyl - 3,5 - bis(trifluoromethyl)-phenylhydrazone having the formula

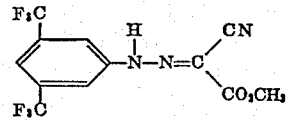

4. The method of claim 1 wherein such compound is α - cyano-α-acetyl-carbonyl-2-chloro-5-(trifluoromethyl)-phenylhydrazone having the formula

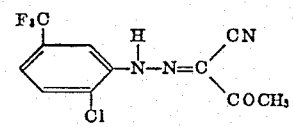

5. The method of claim 1 wherein such compound is α-cyano-α-carboethoxy-carbonyl - 2,4,5 - trichloro-phenylhydrazone having the formula

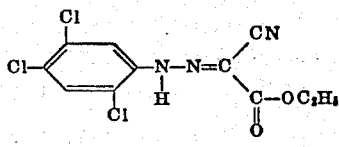

6. The method of claim 1 wherein such compound is α - cyano-α-acetyl-carbonyl-4-(trifluoromethylmercapto)-phenylhydrazone having the formula

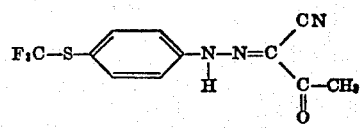

7. The method of claim 1 wherein such compound is α-chloro - α - acetyl-carbonyl-2,6-dimethyl-phenylhydrazone having the formula

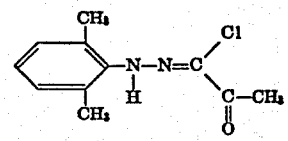

8. The method of claim 1 herein such compound is α-cyano-α-carbomethoxy - carbonyl - 4 - (trifluoromethylsulfonyl)-phenylhydrazone having the formula

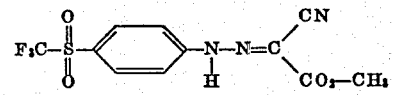

9. An arthropodicidal composition comprising arthropodically effective amounts of a compound having the formula

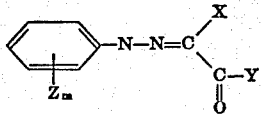

in which
  X is selected from the group consisting of halo, cyano and nitro,
  Y is selected from the group consisting of alkyl having 1–4 carbon atoms, alkoxy having 1–4 carbon atoms and —NRR' in which R and R' each individually is selected from the group consisting of hydrogen and alkyl having 1–3 carbon atoms,
  Z is selected from the group consisting of alkyl having 1–4 carbon atoms, halo, nitro, cyano, trifluoromethyl, trifluoromethylmercapto, trifluoromethylsulfonyl, trifluoromethylsulfoxyl, alkylsulfonyl having 1–4 carbon atoms, dimethylamino sulfonyl and alkoxy having 1–4 carbon atoms, and
  m is a whole number from 1–5, or the alkali metal, alkaline earth metal or the amine salt thereof,
in admixture with a solid diluent or carrier or in admixture with a liquid diluent or carrier and a surface-active agent.

10. The composition of claim 9 wherein such compound is selected from the group consisting of:

α-cyano - α - carbomethoxy - carbonyl-3,5-bis(trifluoromethyl)-phenylhydrazone;

α-cyano - α - acetyl-carbonyl-2-chloro-5-(trifluoromethyl)-phenylhydrazone;

α-cyano - α - carboethoxy-carbonyl-2,4,5-trichlorophenylhydrazone;

α-cyano - α - acetyl - carbonyl-4,4-(trifluoromethylmercapto)-phenylhydrazone;

α - chloro - α - acetyl - carbonyl-2,6-dimethyl-phenylhydrazone; and

α-cyano - α - carbomethoxy-carbonyl-4-(trifluoromethylsulfonyl)-phenylhydrazone.

References Cited

UNITED STATES PATENTS 3,150,151  9/1964  Urbschat et al. _____ 260—465
3,213,124  10/1965  Sheppard _____ 260—465

ALBERT T. MEYERS, Primary Examiner
L. SCHENKMAN, Assistant Examiner

U.S. Cl. X..R

424—226, 228, 309, 325, 327